Jan. 17, 1928.                                    1,656,890
S. SCHIFF
DOUGH PROOFING MACHINE
Filed Nov. 12, 1923                   4 Sheets-Sheet 2

Inventor
SIGMUND SCHIFF
By Walter F. Murray
Attorney

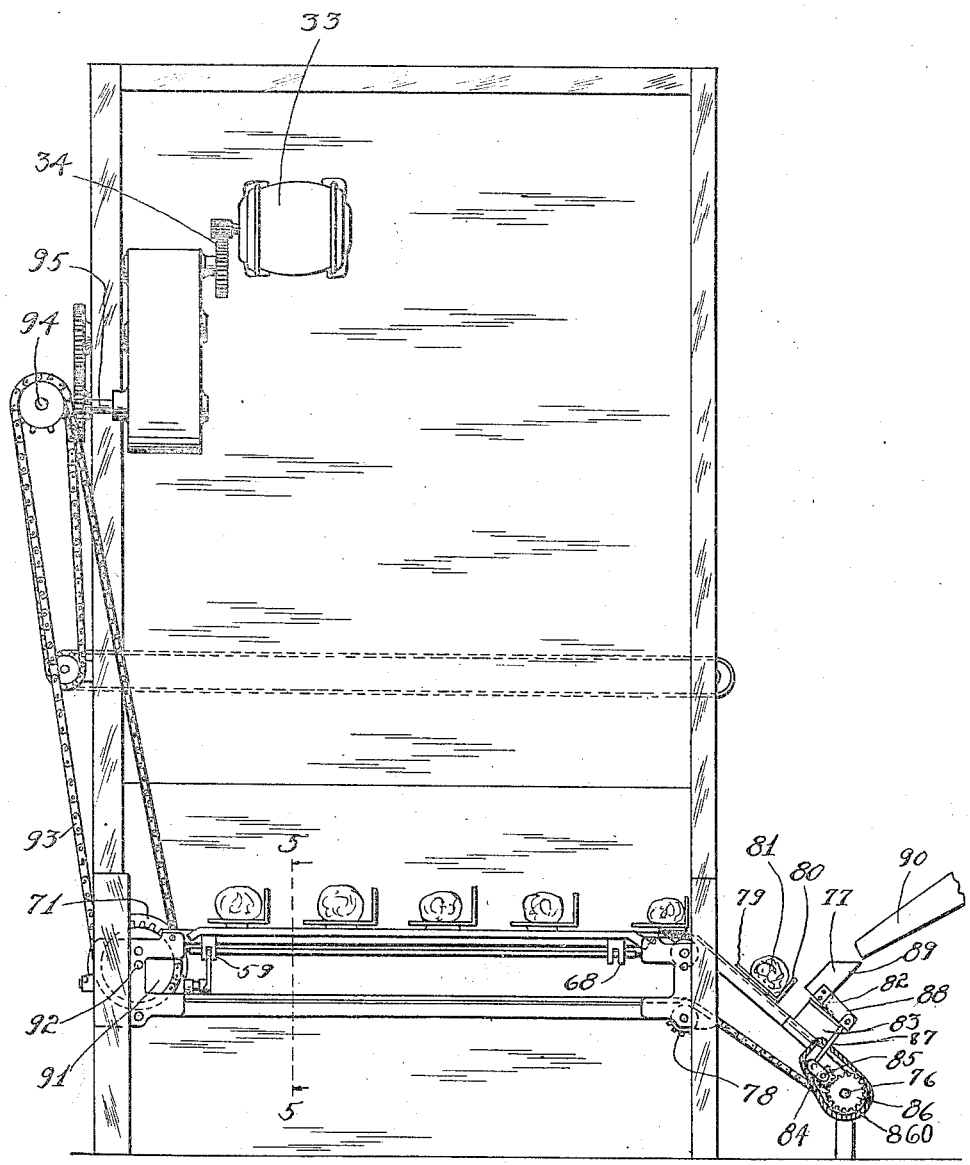

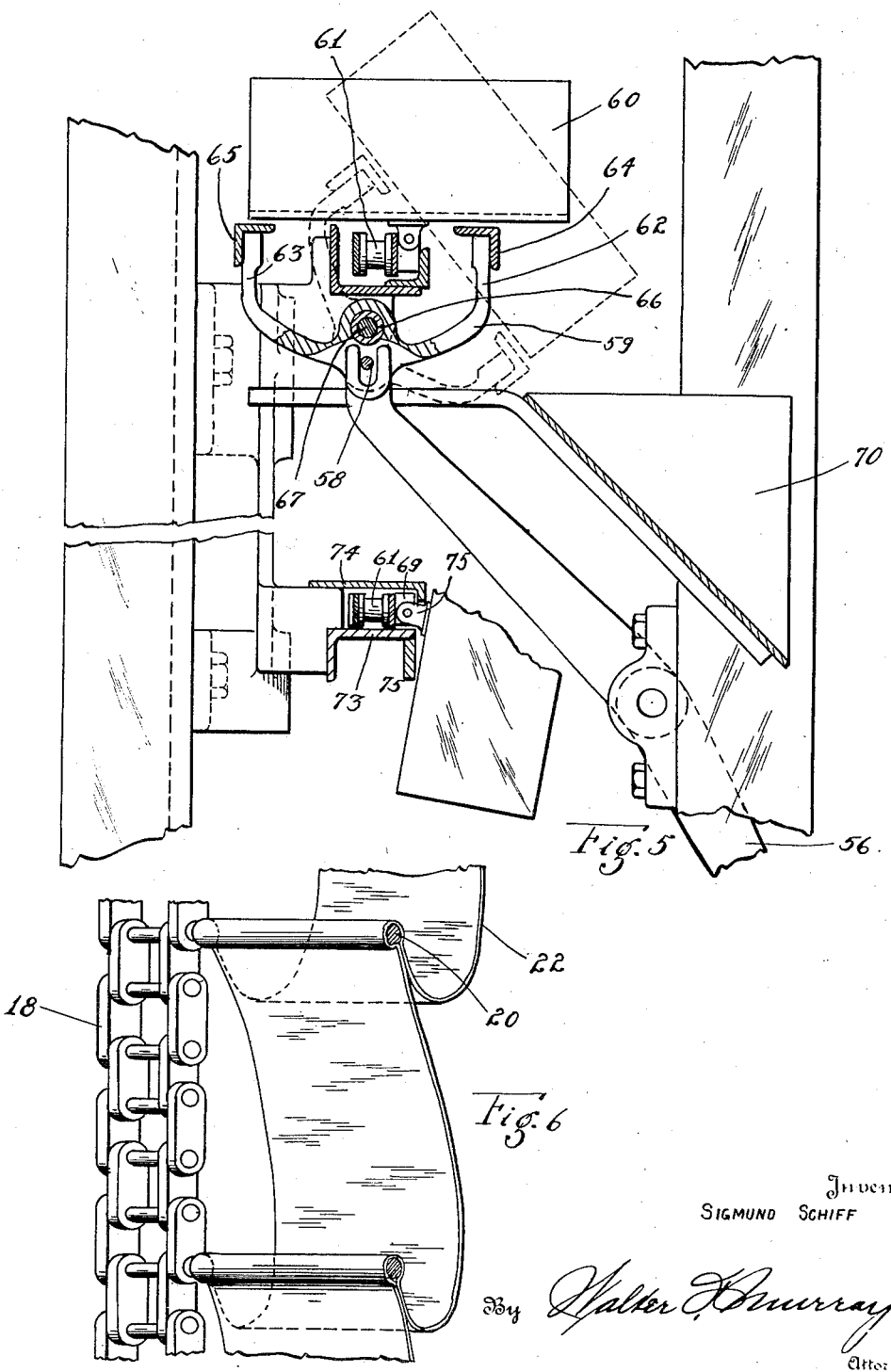

Patented Jan. 17, 1928.

1,656,890

UNITED STATES PATENT OFFICE.

SIGMUND SCHIFF, OF CINCINNATI, OHIO, ASSIGNOR TO THE J. H. DAY COMPANY, OF CINCINNATI, OHIO, A CORPORATION OF OHIO.

DOUGH-PROOFING MACHINE.

Application filed November 12, 1923. Serial No. 674,256.

My invention relates to devices to be used in proofing lumps of dough preparatory to moulding and baking thereof.

An object of my invention is to provide a simple and efficient device of the class referred to.

Another object of my invention is to provide a device in which the individual lumps of dough will from time to time be moved relative to the carrier whereby to permit drying of the dough carrying means and precluding adhesion of the dough on the carrier.

Another object of my invention is to provide a device wherein the likelihood of doubles is minimized whereby to effect efficient co-operation of the proofer with a moulder. Doubles is a term employed in the baking art and means the sticking together of two lumps of dough, each of which lumps was intended for a separate and distinct loaf of bread or the like.

Another object of my invention is to provide a device that may be readily adapted to various conditions met in various bakeries without substantial modification of the various co-operating elements.

These and other objects are attained by the means described herein, and disclosed in the accompanying drawings, in which:

Fig. 4 is an end elevation of a device embodying my invention.

Fig. 5 is an enlarged sectional view on line 5—5 of Fig. 4.

Fig. 6 is a fragmental perspective view of a chain and trays forming details of my invention.

Fig. 7 is a view taken from the left of Fig. 1.

Figure 1:
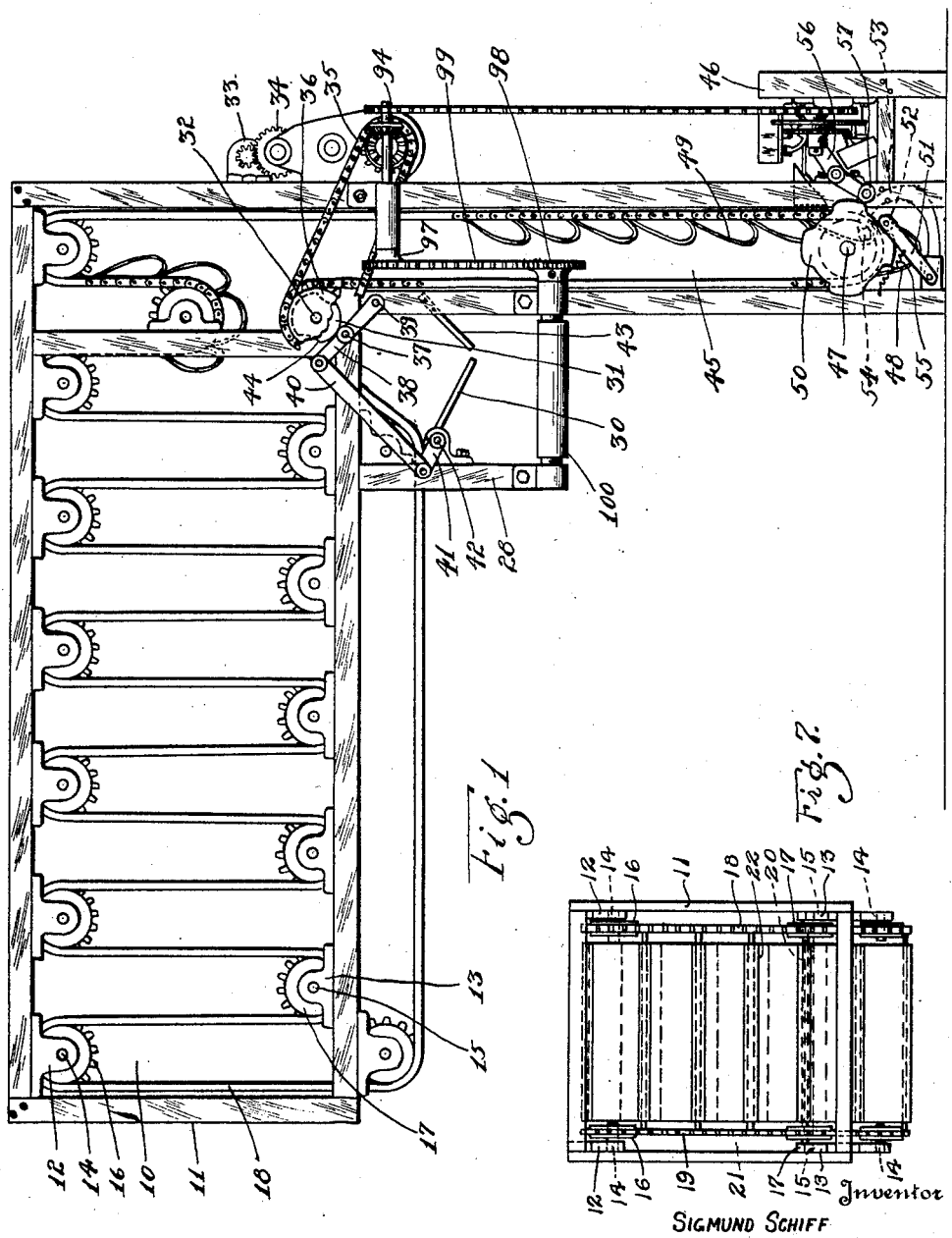
Fig. 1 is a side elevation of a device embodying my invention.

The proofing chamber 10 is provided within a suitable casing 11, the walls of the casing carrying suitable brackets 12 and 13 that serve as bearings for stub shafts 14 and transversely extending shafts 15, respectively. The shafts 14 and 15 carry suitable sprockets 16 and 17, and about which sprockets endless chains 18 and 19 extend. The chains 18 and 19 are disposed at opposite sides of the casing and carry transversely extending rods 20. The trays 21 are formed by providing loops 22 in a continuous piece of canvas, the loops 22 raising the rods 20 and the canvas intermediate succeeding rods 20 forming a pocket or tray. The stub shafts 14 are provided at the top of the device so that the canvas will not be subjected to contact with any parts of the machinery such as shafting. Whereas the pockets or trays depend as they are moved about the shaft 15 the canvas does not contact with the transversely extending shafts 15. It should be noted that as the flexible canvas pockets or trays alternately move upwardly and downwardly, the lumps of dough contained in the individual trays are rolled in the canvas pockets thereby subjecting all parts of the lumps of dough to the atmosphere in the proofer and thereby permitting the uniform drying of the skin about the whole lump of dough. The chains move in the directions of the arrows.

Figure 2:
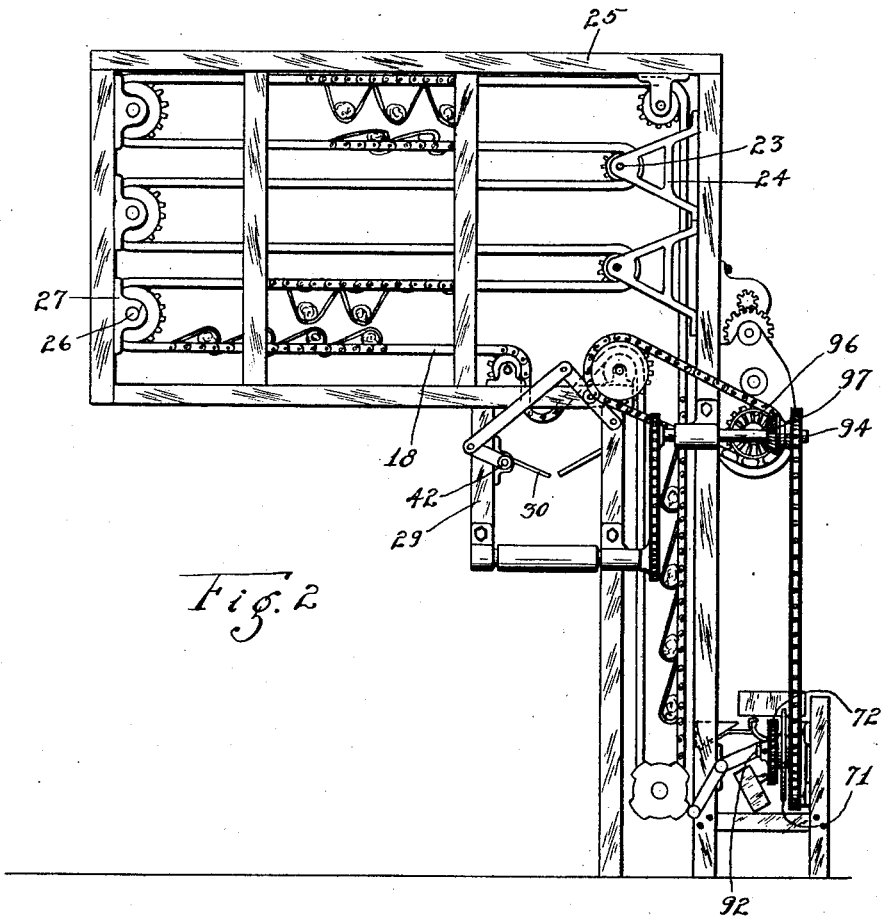
Fig. 2 is a side elevation of a device similar to that shown in Fig. 1, but showing a modified proofing chamber.
Figure 3:
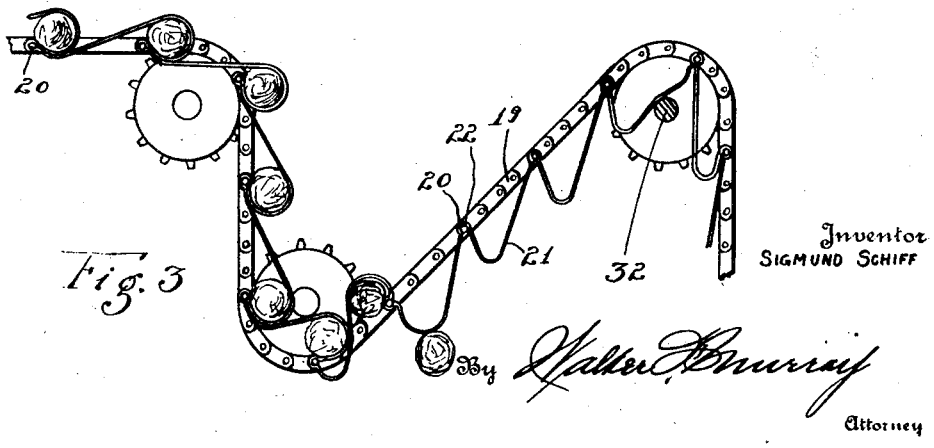
Fig. 3 is an enlarged sectional view of the parts shown in Fig. 2.

In the structure shown in Fig. 2, the shafts 23 carried by the brackets 24 at the forward end of the casing 25 may extend transversely of the casing while the shafts 26 carried by the brackets 27 at the rear of the casing are preferably stub shafts. The occasion for this is readily apparent in view of the structure set forth in Fig. 1 and the explanation thereof and as well as by reference to Fig. 2. In Fig. 2 it will be noted that the trays moving toward the left depend from the rods 20 and that if the shafts 26 extended across the casing the trays would engage such shaft. As the trays move toward the right the lumps of dough are retained in the trays in positions shown in Fig. 3, consequently the trays may move about shafts 23 extending transversely of the casing without contacting said shafts. It should be noted that in the structures disclosed in both Figs. 1 and 2 the lumps of dough are retained in the position shown in Fig. 3 as the trays move toward the discharge device 28 shown in Fig. 1 and the discharge device 29 shown in Figs. 2 and 3. In the discharge of the lumps of dough the chains move upwardly and forwardly at an angle whereby to cause the pockets to discharge the lumps of dough as shown in Fig. 3 upon a transversely extending plate 30. The plate 30 is controlled from a cam 31 carried by the shaft 32 driven from any suitable power supply such as the motor 33, gearing 34, chain 35 and sprocket 36. The chains 18 and 19 are driven from the shaft 32. The cam 31 is engaged by a roller 37 carried by the roller arm 38 pivotally mounted at 39 on the frame 11. The roller arm 38 has its one end pivotally connected by means of a link 40 to a crank 41 associated with and controlling the position of the plate 30. The plate 30 is pivotally mounted at 42 upon the frame. A fixed plate 43 is carried by the frame and with plate 30 forms a receptacle for temporarily retaining the lumps of dough until the plate 30 is permitted to drop because of the cooperation of the cam 31 and the roller 37. The cam 31 is provided with notches 44 in its outer face into which the roller 37 enters for permitting the plate 30 to drop downwardly under the influence of the weight of the dough and plate 30.

It will be noted, by reference to Fig. 3, that as the canvas pockets move downwardly after passage beyond the discharge device that the pockets are disposed exteriorly of the way 45 formed in the casing and leading to the intake device or loading device 46. As the trays pass about the shaft 47 at the bottom of the casing the pocket will depend as shown at 48. Lumps of dough are deposited in the pockets as the pockets are moved upwardly at the forward end of the way 45. The momentum of the lumps of dough passing to the trays may be utilized for pushing the pockets inwardly to positions shown at 49 in which position the pockets retain the lumps of dough. In Fig. 1 a positive means for pushing the canvas to the position shown at 49 is provided. The shaft 47 carries at its end a cam 50. A roller arm 51 is connected with a pair of arms 53 supporting a transversely extending rod 54 and the arms 51 and 53 are mounted on the casing for oscillation. A spring 55 retains the roller 52 in engagement upon the cam 50. From the foregoing it will be apparent that the rod 54 is oscillated through the line of movement of the pockets and that this movement is utilized for pushing the canvas pockets rearwardly of the chains 18 and 19 preparatory to the receipt of lumps of dough from the loading device 46. The cam 50 also serves to control the loading of the trays. A bell crank lever 56 is pivotally mounted on the casing and carries a roller 57 that engages cam 50. The upper end of the lever 56 is bifurcated, the branches being adapted to receive a pin 58. The pin 58 is carried by a bracket 59 of a tilting support over which trays 60 are carried by a chain 61. The bracket 59 comprises upwardly extending arms 62 and 63 carrying transversely extending angles 64 and 65. The bracket 59 is mounted on the tube shaft 66 revolubly supported on shaft 67. A second bracket 68 such as 59 is mounted on the tube shaft 66 and co-operates with the bracket 59 supported in angles 64 and 65. From the foregoing it will be apparent that movement of the bell crank lever 56 will serve to move the brackets 59 and 68 about the shaft 67 consequently any trays such as 60 supported above the angles 64 and 65 will be tilted. The trays are pivotally mounted on blocks 69 carried by the chain 61. The trays are so spaced on the chain and they bear such a relation to the cam 50 that the trays are tilted in units of a given number, for example 4, in order to deposit an equal number of articles in each pocket. Suitable chutes 70 are provided for receiving the dough from the trays and for directing same into the loops, pockets or trays 21. As the trays leave the angles 64 and 65 their forward ends may engage a disc 71 arranged for movement with the sprocket 72 carrying the chain 61, the disc 71 effecting a positive tilting of the discharged trays as they move beyond the support of angles 64 and 65. As the trays move beneath the chute 70 the chain 61 is supported by a suitable channel bar 73. The guide bar 74 in the nature of an angle bracket and carried by the frame provides a front bearing for the block 69 and precludes separation of the chain 61 from its track upon the channel 73. Sufficient space is provided below the front end of the guide bar 74 and the channel bar 73 for providing a way through which the hinge member 75 connecting the block 69 and the tray 60, may extend. After the same has moved beyond the channel 73 it moves downwardly about a sprocket carried by the shaft 76. After the tray is moved beyond the channels 73 they are free to depend from the chain under the influence of gravity, consequently the trays assume a normal or upright position above the chain 61 as they pass upwardly toward the chute 77. The trays are retained in the position shown in Fig. 5 until after they pass the sprocket 78. The gear housing 860 may be provided with any suitable cam or flange (not shown) for straightening and positioning the trays to receive and retain dough from the chute 77. The sprocket 78 supports the chain 61. The trays are preferably provided with a bottom 79 and one side wall 80. The side wall 80 serves as a support to preclude the dough 81 from rolling off the bottom 79 as the tray moves upwardly from the chute 77. The chute 77 is connected by a hinge 82 with a suitable support 83. A crank 84 is driven from a gear 85 by means of a gear 86 carried on the shaft 76. A link 87 pivotally carried by the crank 84 is pivotally connected with an arm 88 carried by the chute 77. The operation of the crank serves to vary the inclination of the bottom 89 of the chute 77 so that the chute is alternately moved to a substantially level position for receiving lumps of dough and then tilted to discharge them. By employing this device it is possible to permit the chute 77 to receive a lump of dough from the nozzle 90 and to retain same until the chute is moved to the position shown in Fig. 4, at which time a tray 60 is in position to receive the lump of dough. The gearing of the several parts is arranged to accomplish said cooperation. The chain 61 is driven from a sprocket 91 mounted on the shaft 92 by means of a suitable chain 93 driven from shaft 94. The shaft 94 is driven from the shaft 95 by suitable bevel gears 96 and 97. The chain 35 of the discharge device is also driven from the shaft 95. The shaft 94 also carries a sprocket 97 from which a sprocket 98 is driven by means of a chain 99 for actuating an endless belt 100 disposed below the discharge plate 30. The operation of my device is as follows:

Dough from a baller is discharged by way of the nozzle 90 upon the chute 77. The dough in the chute 77 is then transferred to the trays 60 as said trays pass below the chutes 77. When a determinable number of trays have passed to the channels 64 and 65 the cam 50, operating through the bell crank lever 56 tilts the trays and causes same to discharge the dough carried thereby into chutes 70 from whence the dough passes into the flexible canvas trays 21. After the trays 60 have been discharged they pass about the disc 71 and assume the position shown in Figs. 2 and 5. As the trays 60 pass beyond the sprocket 78 they swing upon their pivotal mountings and assume a position such in relation to the chain 61 that they may receive lumps of dough from the chutes 77.

After the dough has been deposited in the pockets 21 it is carried through the proofing chamber 10. After the trays pass about the various sprockets and shafts in the proofing chamber the lumps of dough are rolled backward and forward in the canvas trays thereby exposing various parts of the canvas and permitting drying of the canvas and uniform drying of the skin on the dough. After the lumps of dough have passed through the proofing chamber they are discharged as previously explained upon the tray 30 from whence they are discharged upon the endless belt 100. The endless belt 100 may carry the lump of dough to any place or any other suitable mechanism, for example, a moulder.

What I claim is:

1. In a proofer the combination with a casing, of spaced endless chains mounted for movement through the casing, spaced rods connecting the chains, flexible material extending between adjacent rods for forming pockets, means for loading lumps of dough into the pockets, means for discharging dough from the pockets, and means for directing movement of the pair of chains and pockets through parallel paths alternately in opposite directions whereby to impart frequent intermittent rolling movement of the dough in the pockets as the lumps of dough move from the loading means to the discharge means.

2. In a device of the class described the combination of a pair of endless chains for movement in unison, means for supporting and directing said pair of chains through parallel paths alternately in opposite directions, spaced rods connecting the chains, and flexible pockets supported between adjacent rods and adapted to receive lumps of dough and to intermittently roll said lumps of dough as the pockets change direction of movement.

3. In a discharge device of the class described comprising a pair of endless chains, spaced rods connecting the chains, flexible material between the rods forming pockets, the flexible material between adjacent rods being such as to permit same to overhang one of the adjacent rods, means for causing the flexible material to overhang one of the adjacent rods and means to move the chains, rods and pockets at an angle such that the flexible material will recede from its overhanging position whereby to discharge the contents of the pockets.

4. In a device of the class described the combination of a pair of sprockets having aligned axes, a second pair of sprockets having aligned axes, a pair of endless chains, one each of the chains engaging on each of said pairs of sprockets, the sprockets being so related that the chains are aligned transversely of the device, rods connecting the chains, flexible material extending between the rods, the flexible material between the adjacent rods being of a width in excess of the space between adjacent rods whereby pockets may be formed of said material between the adjacent rods, means for guiding the chains to the first mentioned pair of said sprockets in such manner that the pockets will on passing the said first pair of sprockets overhang one of the rods supporting the flexible material forming said pocket, the movement of the chains being such that each pocket will retain said overhanging position as it moves to the second pair of sprockets, and a third pair of sprockets engaged by said chains and positioned so that the chains move upwardly at an angle from the second mentioned pair of sprockets whereby to cause the flexible material to recede from its overhanging position.

5. In a device of the class described the combination of a pair of sprockets having aligned axes, a second pair of sprockets having aligned axes, a pair of endless chains, one each of the chains engaging on each of said pairs of sprockets the sprockets being so related that the chains are aligned transversely of the device, rods connecting the chains, flexible material extending between the rods, the flexible material between the adjacent rods being of a width in excess of the space between adjacent rods whereby pockets may be formed of said material between the adjacent rods, means for guiding the chains to the first mentioned pair of said sprockets in such manner that the pockets will on passing by said first pair of sprockets overhang one of the rods supporting the flexible material forming said pocket, the movement of the chains being such that each pocket will retain said overhanging position as it moves to the second pair of sprockets, and a third pair of sprockets engaged by said chains and positioned so that the chains move upwardly at an angle from the second mentioned pair of sprockets whereby to cause the flexible material to recede from its overhanging position, a pivotally mounted plate below the upwardly inclined portion of the chains and means for periodically oscillating the plate.

6. In a device of the class described the combination of a pair of sprockets having aligned axes, a second pair of sprockets having aligned axes, a pair of endless chains, one each of the chains engaging on each of said pairs of sprockets, the sprockets being so related that the chains are aligned transversely of the device, rods connecting the chains, flexible material extending between the rods, the flexible material between the adjacent rods being of a width in excess of the space between adjacent rods whereby pockets may be formed of said material between the adjacent rods, means for guiding the chains to the first mentioned pair of said sprockets in such manner that the pockets will on passing by said first pair of sprockets overhang one of the rods supporting the flexible material forming said pocket, the movement of the chains being such that each pocket will retain said overhanging position as it moves to the second pair of sprockets, a third pair of sprockets engaged by said chains and positioned so that the chains move upwardly at an angle from the second mentioned pair of sprockets whereby to cause the flexible material to recede from its overhanging position, a pivotally mounted plate below the upwardly inclined portion of the chains, a second plate, the plates together forming a receptacle, and means for moving the pivotally mounted plate for discharging the receptacle.

7. In a device of the class described the combination of a pair of sprockets having aligned axes, a second pair of sprockets having aligned axes, a pair of endless chains, one each of the chains engaging on each of said pairs of sprockets, the sprockets being so related that the chains are aligned transversely of the device, rods connecting the chains, flexible material extending between the rods, the flexible material between the adjacent rods being of a width in excess of the space between adjacent rods whereby pockets may be formed of said material between the adjacent rods, means for guiding the chains to the first mentioned pair of said sprockets in such manner that the pockets will on passing by said first pair of sprockets overhang one of the rods supporting the flexible material forming said pocket, the movement of the chains being such that each pocket will retain said overhanging position as it moves to the second pair of sprockets, a third pair of sprockets engaged by said chains and positioned so that the chains move upwardly at an angle from the second mentioned pair of sprockets whereby to cause the flexible material to recede from its overhanging position, a pivotally mounted plate below the upwardly inclined portion of the chains, a second plate, the plates together forming a receptacle, means for moving the pivotally mounted plate for discharging the receptacle, and an endless conveyor below the plates for receiving articles from the receptacle.

8. In a device of the class described the combination of two pairs of sprockets, a pair of chains moving upwardly between said sprockets, rods connecting the chains, flexible material carried by the rods and forming pockets between succeeding rods, means for positively positioning the pockets in a vertical plane intermediate the axis of the lower sprockets and the vertically extending chain and means for depositing articles in the pockets.

9. In a dough proofing device the combination of a pair of endless chains, rods connecting the chains, flexible pockets between the rods, means for depositing articles in the pockets, means for effecting continuous movement of the chains whereby the loaded pockets are repeatedly moved alternately in opposite directions and means for directing the chains through a path disposed at such an angle to cause said loaded pockets to be inverted under the influence of gravity for discharging articles from the pockets.

10. In a proofer the combination with a casing, of spaced endless chains mounted for movement through the casing, spaced rods connecting the chains, flexible material extending between adjacent rods for forming pockets, means for loading lumps of dough into the pockets, means for discharging dough from the pockets, and means for directing movement of the pair of chains and pockets alternately in opposite directions whereby to impart frequent intermittent rolling movement of the dough in the pockets as the lumps of dough move from the loading means to the discharge means.

11. In a device of the class described the combination of a pair of endless chains for movement in unison, means for supporting and directing said pair of chains alternately in opposite directions, spaced rods connecting the chains, and flexible pockets supported between adjacent rods and adapted to receive lumps of dough and to intermittently roll said lumps of dough as the pockets change direction of movement.

In testimony whereof, I have hereunto subscribed my name this 31st day of October, 1923.

SIGMUND SCHIFF.